United States Patent
Yang et al.

(10) Patent No.: US 9,454,460 B2
(45) Date of Patent: Sep. 27, 2016

(54) METHODS, SYSTEMS, AND MEDIA FOR PROVIDING DETERMINISM IN MULTITHREADED PROGRAMS

(75) Inventors: Junfeng Yang, New York, NY (US); Heming Cui, New York, NY (US); Jingyue Wu, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 865 days.

(21) Appl. No.: 13/190,316

(22) Filed: Jul. 25, 2011

(65) Prior Publication Data
US 2012/0102470 A1   Apr. 26, 2012

Related U.S. Application Data

(60) Provisional application No. 61/367,357, filed on Jul. 23, 2010.

(51) Int. Cl.
*G06F 9/46* (2006.01)
*G06F 11/36* (2006.01)
*G06F 9/45* (2006.01)

(52) U.S. Cl.
CPC ........... *G06F 11/3632* (2013.01); *G06F 8/458* (2013.01)

(58) Field of Classification Search
None
See application file for complete search history.

(56) References Cited

U.S. PATENT DOCUMENTS

| | | | |
|---|---|---|---|
| 4,318,182 A | 3/1982 | Bachman et al. | |
| 6,101,524 A * | 8/2000 | Choi et al. | 718/102 |
| 6,226,787 B1 * | 5/2001 | Serra et al. | 717/125 |
| 6,625,635 B1 * | 9/2003 | Elnozahy | 718/102 |
| 6,745,222 B1 * | 6/2004 | Jones et al. | 718/107 |
| 6,854,108 B1 * | 2/2005 | Choi | 717/125 |
| 7,010,788 B1 * | 3/2006 | Rehg et al. | 718/100 |
| 7,366,768 B2 | 4/2008 | Deo et al. | |
| 7,506,318 B1 * | 3/2009 | Lindo et al. | 717/130 |
| 7,574,686 B1 | 8/2009 | Wadland et al. | |
| 7,958,497 B1 * | 6/2011 | Lindo et al. | 717/128 |
| 2007/0083565 A1 | 4/2007 | McKenney | |
| 2008/0028382 A1 * | 1/2008 | Arnold et al. | 717/155 |
| 2008/0098339 A1 | 4/2008 | Chan | |

(Continued)

FOREIGN PATENT DOCUMENTS

WO    WO/2009/114645    3/2009

OTHER PUBLICATIONS

Russinovich et al., "Replay for concurrent non-deterministic shared-memory applications", 1996, Proceedings of the ACM SIGPLAN 1996 conference on Programming language design and implementation, pp. 258-266.*

(Continued)

*Primary Examiner* — Jue Louie
(74) *Attorney, Agent, or Firm* — Byrne Poh LLP (57) ABSTRACT

Methods, systems, and media for providing determinism in multithreaded programs are provided. In some embodiments, methods for providing determinism in multithreaded programs are provided, the methods comprising: instrumenting a program with: a proxy that: receives inputs to the program; and determines whether a schedule corresponding to a set of input constraints satisfied by the inputs has been memoized; and a replayer that: if it is determined that a schedule corresponding to a set of input constraints satisfied by the inputs has been memoized, processes the inputs by the program according to the schedule.

20 Claims, 9 Drawing Sheets

(56) References Cited

U.S. PATENT DOCUMENTS

| | | | | |
|---|---|---|---|---|
| 2008/0120619 | A1* | 5/2008 | Podila | 718/102 |
| 2009/0019431 | A1* | 1/2009 | George et al. | 717/151 |
| 2009/0165006 | A1* | 6/2009 | Ceze et al. | 718/102 |
| 2009/0235262 | A1* | 9/2009 | Ceze et al. | 718/102 |
| 2011/0296432 | A1 | 12/2011 | Rajan et al. | |

OTHER PUBLICATIONS

Ziarek et al. "Partial Memoization of Concurrency and Communication", Aug. 31-Sep. 2, 2009, Proceedings of the 14th ACM SIGPLAN international conference on Functional programming.*

Aichernig et al. "Conformance Testing of Distributed Concurrent Systems with Executable Designs", 2009,LNCS 5751, pp. 61-81.*

Aitekar, G. and Stoica, I., "ODR: Output-Deterministic Replay for Multicore Debugging", In Proceedings of the 22nd ACM Symposium on Operating Systems Principles (SOSP '09), Big Sky, MT, USA, Oct. 11-14, 2009, pp. 193-206.

Altekar, G., et al., "OPUS: Online Patches and Updates for Security", In Proceedings of the 14th USENIX Security Symposium (SSYM '05), vol. 14, No. 19, Baltimore, MD, USA, Jul. 31-Aug. 5, 2005, pp. 287-302.

Appavoo, J., et al., "Enabling Autonomic System Software with Hot-Swapping", White Paper, Nov. 2002, available at: http://web.archive.org/web/20060316175537/http://www.research.ibm.com/K42/papers/auto-vis.pdf.

Appavoo, J., et al., "K42 Overview", White Paper, Aug. 2002, available at: http://web.archive.org/web/20060316175757/http://www.research.ibm.com/K42/white-papers/Overview.pdf.

Appavoo, J., et al., "K42's Performance Monitoring and Tracing Infrastructure", White Paper, Aug. 2002, available at: http://web.archive.org/web/20060316175558/http://www.research.ibm.com/K42/white-papers/PerfMon.pdf.

Appavoo, J., et al., "Memory Management in K42", White Paper, Aug. 2002, available at: http://web.archive.org/web/20060316175717/http://www.research.ibm.com/K42/white-papers/MemoryMgmt.pdf.

Appavoo, J., et al., "Scheduling in K42", White Paper, Aug. 2002, available at: http://web.archive.org/web/20060316175724/http://www.research.ibm.com/K42/white-papers/Scheduling.pdf.

Appavoo, J., et al., "Utilizing Linux Kernel Components in K42", White Paper, Aug. 2002, available at: http://web.archive.org/web/20060316175819/http://www.research.ibm.com/K42/white-papers/LKIntern.pdf.

Arnold, J. and Kaashoek, F.M., "Ksplice: Automatic Rebootless Kernel Updates", In Proceedings of the 4th ACM European Conference on Computer Systems (EuroSys '09), Nuremberg, DE, Apr. 1-3, 2009, pp. 187-198.

Auslander, M., et al., "Customization Lite", In Proceedings of the 6th Workshop on Hot Topics in Operating Systems (HotOS-VI '97), Cape Cod, MA, USA, May 5-6, 1997, pp. 43-48.

Baumann, A., et al., "Providing Dynamic Update in an Operating System", In Proceedings of the 2005 USENIX Annual Technical Conference (USENIX '05), Anaheim, CA; USA, Apr. 10-15, 2005, pp. 279-291.

Bergen, T., et al., "CoreDet: A Compiler and Runtime System for Deterministic Multithreaded Execution", In Proceedings of the 15th International Conference on Architectural Support for Programming Languages and Operating Systems (ASPLOS '10), Pittsburgh, PA, USA, Mar. 13-17, 2010, pp. 53-64.

Berger, E.D., et al., "Grace: Safe Multithreaded Programming for C/C++", In Proceedings of the 24th Annual ACM SIGPLAN Conference on Object-Oriented Programming, Systems, Languages, and Applications (OOPSLA '09), Orlando, FL, USA, Oct. 25-29, 2009, pp. 81-96.

Bruening, D. and Chapin, J., "Systematic Testing of Multithreaded Programs", Technical Report MIT-LCS-TM-607, Massachusetts Institute of Technology, May 2, 2000, pp. 1-11.

Bruening, D.L., "Efficient, Transparent, and Comprehensive Runtime Code Manipulation", Ph.D Dissertation, Massachusetts Institute of Technology, Sep. 2004, pp. 1-306.

Cadar, C., et al., "EXE: Automatically Generating Inputs of Death", In Proceedings of the 13th ACM Conference on Computer and Communicatons Security (CCS '06), Alexandria, VA, USA, Oct. 30-Nov. 3, 2006, pp. 322-335.

Cadar, C., et al., "KLEE: Unassisted and Automatic Generation of High-Coverage Tests for Complex Systems Programs", In Proceedings of the 8th Symposium on Operating Systems Design and Implementation (OSDI '08), San Diego, CA, USA, Dec. 8-10, 2008, pp. 209-224.

Candea, G., et al., "Automated Software Testing as a Service", In Proceedings of the 1st ACM Symposium on Cloud Computing (SOCC '10), Indianapolis, IN, USA, Jun. 10-11, 2010, pp. 155-160.

Castro, M., et al., "Better Bug Reporting with Better Privacy", In Proceedings of the 13th International Conference on Architectural Support for Programming Languages and Operating Systems (ASPLOS XIII '08), Seattle, WA, USA, Mar. 1-5, 2008, pp. 319-328.

Chen, H., et al., "Live Updating Operating Systems using Virtualization", In Proceedings of the 2nd International Conference on Virtual Execution Environments (VEE '06), Ottawa, ON, CA, Jun. 14-16, 2006, pp. 35-44.

Chipounov. V., et al., "Selective Symbolic Execution", In Proceedings of the 5th Workshop on Hot Topics in System Dependability (HotDep '09), Lisbon, PT, Jun. 29, 2009.

Costa, M., et al., "Bouncer: Securing Software by Blocking Bad Input", In Proceedings of the 21st ACM Symposium on Operating Systems Principles (SOSP '07), Stevenson, WA, USA, Oct. 14-17, 2007, pp. 117-130.

Costa, M., et al., "Vigilante: End-to-End Containment of Internet Worms", In Proceedings of the 20th ACM Symposium on Operating Systems Principles (SOSP '05). Brighton, UK, Oct. 23-26, 2005, pp. 133-147.

Devietti. J. et al., "DMP: Deterministic Shared Memory Multiprocessing", In Proceedings of the 14th International Conference on Architectural Support for Programming Languages and Operating Systems (ASPLOS '09), Washington, DC, USA, Mar. 7-11, 2009, pp. 85-96.

Dunlap, G.W., et al., "Execution Replay of Multiprocessor Virtual Machine", In Proceedings of the 4th International Conference on Virtual Execution Environments (VEE '08), Seattle, WA, USA, Mar. 5-7, 2008, pp. 121-130.

Dunlap, G.W., et al., "ReVirt: Enabling Intrusion Analysis Through Virtual-Machine Logging and Replay", In Proceedings of the Fifth Symposium on Operating Systems Design and Implementation (OSDI '02), Boston, MA, USA, Dec. 9-11, 2002, pp. 211-224.

Eich, B., "Mozilla Bug 133773", Bugzilla, Mar. 27, 2002, available at: https://bugzilla.mozilla.org/show_bug.cgi?id=133773.

Engler, D. and Ashcraft, K., "RacerX: Effective, Static Detection of Race Conditions and Deadlocks", In Proceedings of the ACM Symposium on Operating Systems Principles (SOSP '03), Bolton Landing, NY, USA, Oct. 19-22, 2003, pp. 237-252.

Engler, D., et al., "Checking System Rules using System-Specific, Programmer-Written Compiler Extensions", In Proceedings of the 4th Symposium on Operating Systems Design and Implementation (OSDI'00), San Diego, CA, USA, Oct. 23-25, 2000, pp, 1-16.

Ford, B. and Cox, R., "Vx32: Lightweight User-level Sandboxing on the x86", In Proceedings of the USENIX Annual Conference (USENIX '08), Boston, MA, USA, Jun. 22-27, 2008, pp. 293-306.

Geels, D., et al., "Friday: Global Comprehension for Distributed Replay", In Proceedings of the Fourth Symposium on Networked Systems Design and Implementation (NSDI '07), Cambridge, MA, USA, Apr. 11-13, 2007, pp, 285-298.

Gilchrist, J., Parallel BZIP2 (PBZIP2)°, Compression.ca, Jul. 18, 2011, available at: http://compression.ca/pbzip2/.

Gilmore, S., et al., "Dynamic ML without Dynamic Types", Technical Report ECS-LFCS-97-378, University of Edinburgh, 1997.

Godefroid, P., et al., "Automated Whitebox Fuzz Testing", In Proceedings of 15th Network and Distributed System Security Sumposium (NDSS '08), San Diego, CA, USA, Feb. 10-13, 2008.

(56) References Cited

OTHER PUBLICATIONS

Godefroid, P., et al., "Dart Directed Automated Random Testing", In Proceedings of the ACM SIGPLAN 2005 Conference on Programming Language Design and Implementation (PLDI '05), Chicago, IL, USA, Jun. 12-15, 2005, pp. 213-223.

Godefroid, P., et al., "Grammar-Based Whitebox Fuzzing", In Proceedings of the ACM SIGPLAN 2008 Conference on Programming Language Design and Implementation (PLDI '08), Tucson, AZ, USA, Jun. 7-13, 2008, pp. 206-215.

Guo, Z., et al., "R2: An Application-Level Kernel for Record and Replay", In Proceedings of the 8th USENIX Symposium on Operating Systems Design and Implementation (OSDI 03), San Diego, CA, USA, Dec. 8-10,2008, pp. 193-208.

Gupta, D., et al., "A Formal Framework for On-line Software Version Change", In IEEE Transactions on Software Engineering, vol. 22, No. 2, Feb. 1996, pp. 120-131.

Hecht, M.S. and Ullman, J.D., "Characterizations of Reducible Flow Graphs", In Journal of the ACM, vol. 21, No. 3, Jul. 1974, pp. 367-375.

Hunt, G. and Brubacher, D., "Detours: Binary Interception of Win32 Functions", In Proceedings of the 3rd USENIX Windows NT Symposium (WINSYM '99), Seattle, WA, USA, Jul. 12-13, 1999, pp. 135-144.

Joshi, P., et al., "A Randomized Dynamic Program Analysis Technique for Detecting Real Deadlocks", In Proceedings of the ACM SIGPLAN 2009 Conference on Programming Language Design and Implementation (PLDI'09), Dublin, IE, Jun. 15-21, 2009, pp. 110-120.

Jula, H., et al., "Deadlock Immunity: Enabling Systems to Defend Against Deadlocks", In Proceedings of the 8th Symposium on Operating Systems Design and Implementation (OSDI '08), San Diego, CA, USA, Dec. 8-10, 2008, pp. 295-308.

Kiczales, G., et al., "Aspect-Oriented Programming", In Proceedings of the 11th European Conference on Object-Oriented Programming (ECOOPS '97), Jyväskylá, FI, Jun. 9-13, 1997, pp. 220-242.

Konuru, R., et al., "Deterministic Replay of Distributed Java Applications", In Proceedings of the 14th International Symposium on Parallel and Distributed Processing (IPDPS '00), Cancun, MX, May 1-5, 2000, pp. 219-228.

Lee, E.A., "The Problem with Threads", In IEEE Computer, vol. 39, No. 5, May 2006, pp, 33-42.

Liblit, B., et al., "Bug Isolation via Remote Program Sampling", In Proceedings of the ACM SIGPLAN 2003 Conference on Programming Language Design and Implementation (PLDI '03), San Diego, CA, USA, Jun. 9-11, 2003, pp. 141-154.

Lu, S., et al., "AVIO: Detecting Atomicity Violations via Access Interleaving Invariants", In Proceedings of the 12th International Conference on Architectural Support for Programming Languages and Operating Systems (ASPLOS '06), San Jose, CA, USA, Oct. 21-25, 2006, pp. 37-48.

Lu, S., et al., "Learning from Mistakes—A Comprehensive Study on Real World Concurrency Bug Characteristics", In Proceedings of the 13th International Conference on Architectural Support for Programming Languages and Operating Systems (ASPLOS XIII '08), Seattle, WA, USA, Mar. 1-5, 2008, pp. 329-339.

Lu, S., et al., "MUVI: Automatically Inferring Multi-Variable Access Correlations and Detecting Related Semantic and Concurrency Bugs", In Proceedings of the 21st ACM Symposium on Operating Systems Principles (SOSP '07), Stevenson, WA, USA, Oct. 14-17, 2007, pp. 103-116.

Luk, C., et al., "Pin: Building Customized Program Analysis Tools with Dynamic Instrumentation", In Proceedings of the ACM SIGPLAN 2005 Conference on Programming Language Design and Implementation (PLDI '05), Chicago, IL, USA, Jun. 12-15, 2005, pp. 190-200.

Makris, K., and Ryu, K.D., "Dynamic and Adaptive Updates of Non-Quiescent Subsystems in Commodity Operating System Kernels", In Proceedings of the 2nd ACM SIGOPS/EuroSys European Conference on Computer Systems (EuroSys '07), Lisbon, PT, Mar. 21-23, 2007, pp. 327-340.

Montesinos, P., et al., "Capo: A Software-hardware Interface for Practical Deterministic Multiprocessor Replay", In Proceedings of the 14th International Conference on Architectural Support for Programming Languages and Operating Systems (ASPLOS '09), Washington, DC, USA, Mar. 7-11, 2009, pp. 73-84.

Musuvathi, M., et al., "Finding and Reproducing Heisenbugs in Concurrents Programs", In Proceedings of the Eight Symposium on Operating Systems Design and Implementation (OSDI '08), San Diego, CA, USA, Dec. 8-10, 2008, pp. 267-280.

Neamtiu, I. and Hicks, M., "Safe and Timely Dynamic Updates for Multi-Threaded Programs", In Proceedings of the ACM SIGPLAN 2009 Conference on Programming Language Design and Implementation (PLDI '09), Dublin, IE, Jun. 15-21, 2009, pp. 13-24.

Neamtiu, I., et al., "Practical Dynamic Software Updating for C", In Proceedings of the ACM SIGPLAN 2006 Conference on Programming Language Design and Implementation, Ottawa, ON, CA, Jun. 11-14, 2006, pp. 72-83.

Necula, G.C., et al., "Cil: Intermediate Language and Tools for Analysis and Transformation of C Programs", In Proceedings of Conference on Compiler Construction (CC '02), Grenoble, FR, Apr. 8-12, 2002, pp. 213-228.

Olszewski, M., et al., "Kendo: Efficient Deterministic Multithreading in Software", In Proceedings of the 14th International Conference on Architectural Support for Programming Languages and Operating Systems (ASPLOS '09), Washington, DC, USA, Mar. 7-11, 2009, pp. 97-106.

Park, C.S. and Sen, K., "Randomized Active Atomicity Violation Detection in Concurrent Programs", In Proceedings of the 16th ACM SIGSOFT International Symposium on Foundations of Software Engineering (SIGSOFT '08/FSE-16), Atlanta, GA, USA, Nov. 9-14. 2008, pp, 135-145.

Park, S., et al., "Ctrigger: Exposing Atomicity Violation Bugs from their Hiding Places", In Proceedings of the 14th International Conference on Architectural Support for Programming Languages and Operating Systems (ASPLOS XIV '09), Washington, DC, USA, Mar. 7-11, 2009, pp, 25-38.

Park, S., et al., "Pres: Probabilistic Replay with Execution Sketching on Multiprocessors", In Proceedings of the 22nd ACM Symposium on Operating Systems Principles (SOSP '09), Big Sky, MT, USA, Oct. 11-14, 2009, pp. 177-192.

Perkins, J.H., et al., "Automatically Patching Errors in Deployed Software", In Proceedings of the 22nd ACM Symposium on Operating Sytems Principles (SOSP '09), Big Sky, MT, USA, Oct. 11-14, 2009, pp. 87-102.

Qin, F., et al., "Rx: Treating Bugs as Allergies—A Safe Method to Survive Software Failures", In Proceedings of the 20th ACM Symposium on Operating Systems Principles (SOSP '05), Brighton, UK, Oct. 23-26, 2005, pp. 235-248.

Ranger, C., et al., "Evaluating MapReduce for Multi-Core and Multiprocessor Systems", In Proceedings of the 13th International Symposium on High Performance Computer Architecture (HPCA '07), Phoenix, AZ, USA, Feb. 10-14, 2007, pp. 13-24.

Saltzer, J.H., et al., "End-to-End Arguments System Design", In ACM Transactions on Computer Systems, vol. 2, No. 4, Nov. 1984, pp. 277-288.

Savage, S., et al., "Eraser: A Dynamic Data Race Detector for Multithreaded Programming", In ACM Transactions on Computer Systems (TOCS), vol. 15, No. 4, Nov. 1997, pp. 391-411.

Schultz, M., et al., "Scalable Dynamic Binary Instrumentation for Blue Gene/L", In Computer Architecture News (SIGARCH), vol. 33, No. 5, Dec. 2005, pp. 9-14.

Sen, K., "Race Directed Random Testing of Concurrent Programs", In Proceedings of the ACM SIGPLAN 2008 Conference on Programming Language Design and Implementation (PLDI '08), Tucson, AZ, USA, Jun. 7-13, 2003, pp. 11-21.

Sen, K., et al., "CUTE: A Concolic Unit Testing Engine for C", In Proceedings of the 10th European Software Engineering Conference (ESEC '05), Lisbon, PT, Sep. 5-9, 2005, pp, 263-272.

Sidiroglou, S., et al., "ASSURE: Automatic Software Self-Healing using Rescue Points", In Proceedings of the 14th International Conference on Architectural Support for Programming Languages and Operating Systems (ASPLOS XIV '09), Washington, DC, USA; Mar. 7-11, 2009, pp. 37-48.

(56) References Cited

OTHER PUBLICATIONS

Singh, J.P., et al., "SPLASH: Stanford Parallel Applications for Shared-Memory", Technical Report No. CSL-TR-91-469, Stanford University, Apr. 1991.

Soules, C.A.N., et al., "System Support for Online Reconfiguration", White Paper, Nov. 2002, available at: http://web.archive.org/web/20080316175644/http://www.research.ibm.com/K42/papers/auto-res.pdf.

Srinivasan, S.M., et al., "Flashback: A Lightweight Extension for Rollback and Deterministic Replay for Software Debugging", In Proceedings of the USENIX Annual Technical Conference (USENIX '04), Boston, MA, USA, Jun. 27-Jul. 2, 2004, pp. 29-44.

Subramanian, S., et al., "Dynamic Software Updates: A VM-centric Approach", In Proceedings of the 2009 ACM SIGPLAN Conference on Programming Language Design and Implementation (PLDI '09), Dublin, IE, Jun. 15-21, 2009, pp. 1-12.

Sun, Y., et al., "MT-Scribe: A Tool for Recording and Inferring Model Transformations", In Companion to the 24th Annual ACM SIGPLAN Conference on Object-Oriented Programming, Systems, Languages, and Applications (OOPSLA '09), Orlando, FL, USA, Oct. 25-29, 2009, pp. 815-816.

Thies, W., et al., "Streamlt: A Language for Streaming Applications", In Proceedings of the 11th International Conference on Compiler Construction (CC '02), Grenoble, FR, Apr. 8-12, 2002, pp. 179-196.

U.S. Appl. No. 13/189,263, filed Jul. 22, 2011.

U.S. Appl. No. 61/366,900, filed Jul. 22, 2010.

U.S. Appl. No. 81/367,357, filed Jul. 23, 2010.

Vasudevan, N. and Edwards, S.A., "Ceiling SHIM: Compiling Deterministic Concurrency to a Heterogeneous Multicore" In Proceedings of the 2009 ACM Symposium on Applied Computing (SAC '09), Honolulu, HI, USA, Mar. 8-12, 2009, pp. 1626-1631.

Wagner, R.A. and Fischer, M.J.., "The String-to-String Correction Problem", In Journal of the ACM, vol. 21, No. 1, Jan. 1974, pp. 168-173.

Wang, Y., et al., "Gadara: Dynamic Deadlock Avoidance for Multithreaded Programs", In Proceedings of the 8th USENIX Symposium on Operating Systems Design and Implementation (OSDI '08), San Diego, CA, USA, Dec. 8-10, 2008, pp. 281-294.

Yang, J., et al., "Automatically Generating Malicious Disks using Symbolic Execution", In Proceedings of the IEEE Symposium on Security & Privacy (S&P '06), Berkeley, CA, USA, May 21-24, 2006, pp. 243-257.

Yang, J., et al., "MODIST: Transparent Model Checking of Unmodified Distributed Systems", In Proceedings of the 6th USENIX Symposium on Networked Systems Design and Implementation, (NSDI '09), Boston, MA, USA, Apr. 22-24, 2009, pp. 213-228.

Yu, Y., et al., "Racetrack: Efficient Detection of Data Ram Conditions via Adaptive Tracking", In Proceedings of the 20th ACM Symposium on Operating Systems Principles (SOSP '05), Brighton, UK, Oct. 23-26, 2005, pp. 221-234.

Zhang, W., et al., "ConMem: Detecting Severe Concurrency Bugs through an Effect-Oriented Approach", In Proceedings of the 15th International Conference on Architectural Support for Programming Languages and Operating Systems (ASPLOS-XV '10), Pittsburgh, PA, USA, Mar. 13-17, 2010, pp. 179-192.

"Ksplice", Ksplice.com, Jul. 19, 2011, pp. 1-10, available at: http://www.ksplice.com.

"VMWare Virtual Lab Automation", White Paper, VMWare.com, copyright 2006, last accessed Oct. 23, 2014, pp. 1-11, available at: http://www.vmware.com/pdf/virtual_lab_automation_whitepaper.pdf.

Adve, V., et al., "The LLVM Compiler", last updated Sep. 4, 2014, pp. 1-13, available at: http://www.llvm.org.

Aho, A. V., et al., "Compilers: Principles, Techniques, and Tools", 2nd Edition, Addison Wesley, Sep. 10, 2006, pp. 655-671.

Ball, T. and Larus, J.R., "Branch Prediction for Free", In PLDI '93: Proceedings of the Conference on Programming Language Design and Implementation, Jun. 21-25, 1993, pp. 300-313.

Ball, T. and Larus, J.R., "Efficient path profiling", In MICRO 29: Proceedings of the 29th International Symposium on Microarchitecture, Dec. 2-4, 1996, pp. 46-57.

Blumofe, R.D., et al., "Cilk: an Efficient Multithreaded Runtime System" In Journal of Parallel and Distributed Computing, vol. 37, No. 1, Aug. 25, 1996, pp. 55-69.

Cui, A., et al., "Stable Deterministic Multithreading through Schedule Memoization", In Proceedings of the 9th Symposium on Operating Systems Design and Implementation, Oct. 2010, pp. 1-15.

Dey, A.S., et al., "Database Test Suite", SourceForge.net, Oct. 1, 2010, pp. 1-6, available at: http://sourceforge.net/projects/osdldbt/.

Fisher, J.A. and Freudenberger, S.M., "Predicting conditional branch directions from previous runs of a program", In Proceedings of the 5th International Conference on Architechtural Support for Programming Languages and Operating Systems, vol. 27, No. 9, Sep. 1992, pp. 85-95.

Kopytov, A., "SysBench: A System Performance Benchmark", Jul. 16, 2011, pp. 1-8, available at: http://sysbench.sourceforge.net.

Laadan, O., et al., "Transparent, Lightweight Application Execution Replay on Commodity Multiprocessor Operating Systems" In Proceedings of the International Conference on Measurement and Modeling of Computer Systems, Jun. 2010, pp. 155-166.

Lu, S., et al., "Bugbench: Benchmarks for Evaluating Bug Detection Tools", In Proceedings of the 1st Workshop on the Evaluation of Software Defect Detection Tools, Jun. 2005, pp. 1-5.

Office Action dated Jun. 20, 2014 in U.S. Appl. No. 13/189,263.

Office Action dated Nov. 26, 2013 in U.S. Appl. No. 13/189,263.

Ronsse, M., and De Bosschere, K., "Recplay: a Fully Integrated Practical Record/Replay Systems", In ACM Transactions on Computer Systems, vol. 17, No. 2, May 1999, pp. 133-152.

The Apache Software Foundation, "Apache HTTP server benchmarking tool", Apache.org, last accessed Nov. 7, 2014, pp. 1-5, available at: http://httpd.apache.org/docs/2.2/programs/ab.html.

University of Maryland, "Dynamic Software Updating", UMD.edu, Aug. 15, 2010, pp. 1, available at: http://www.cs.umd.edu/projects/PL/dsu/.

* cited by examiner

FIG. 1

```
 1:  main(int argc, char *argv[]) {
 2:    int i, nthread = argv[1], nblock = argv[2];
 3:    symbolic(&nthread, sizeof(int));  // mark input data
 4:    symbolic(&nblock, sizeof(int));   // that affects schedules
 5:    for(i=0; i<nthread; ++i)          ──── 218
 6:      pthread_create(worker);         // create worker threads
 7:    for(i=0; i<nblock; ++i) {         ──── 220
 8:      block = read_block(i);          // read i'th file block
 9:      worklist.add(block);            // add block to work list
10:    }
11:  }
12:  worker() {                          // worker threads for compressing file blocks
13:    for(;;) {
14:      block = worklist.get();         // get a file block from work list
15:      compress(block);
16:    }
17:  }
```

FIG. 2

```
// main              worker 1            worker 2

9: worklist.add();
              14: worklist.get();
9: worklist.add();
                                  14: worklist.get();
```

```
5: 0 < nthread ?   true
5: 1 < nthread ?   true
5: 2 < nthread ?   false
7: 0 < nblock ?    true
7: 1 < nblock ?    true
7: 2 < nblock ?    false
```

| Annotations | Inserted | Semantics |
|---|---|---|
| symbolic(*data, len*) | Manually | Marks data that may affect schedules. The memoizer tracks constraints on this data. The replayer checks this data against the memoized constraints. |
| begin_task()<br>end_task() | Manually | Mark the beginning and end of a logical task. Often used to divide the executions of threads in a pool into separate tasks |
| lock_wrapper()<br>unlock_wrapper() | Manual or Auto. | Synchronization wrappers. The memoizer intercepts these operations for memoizing schedules, and the replayer intercepts them for reusing schedules. |
| before_blocking()<br>after_blocking() | Auto. | Inserted before and after blocking system calls. The memoizer logs the order of these calls. The replayer opportunistically enforces the same order of these calls. |

502 → Annotations
512 → Inserted
504 → symbolic(*data, len*)
506 → begin_task() / end_task()
508 → lock_wrapper() / unlock_wrapper()
510 → before_blocking() / after_blocking()

FIG. 5

```
 1:  queue_t activeq, waitq[N];
 2:  pthread_mutex_lock_wrapper(pthread_mutex_t *mutex) {
 3:  retry:
 4:    while(self()!=activeq.head); // wait for our turn
 5:    if(!pthread_mutex_trylock(mutex)) { // mutex acquired
 6:      append(schedule, self()); // add tid to schedule
 7:      move(self(), activeq.tail); // give turn to next thread
 8:      return;
 9:    }
10:    move(self(), waitq[mutex].tail); // deterministically wait
11:    goto retry; // wait for our turn again
12:  }
13:  pthread_mutex_unlock_wrapper(pthread_mutex_t *mutex) {
14:    while(self()!=activeq.head); // wait for our turn
15:    pthread_mutex_unlock(mutex); // mutex released
16:    wake_up(waitq[mutex].head); // deterministically wake up
17:    append(schedule, self()); // add tid to schedule
18:    move(self(), activeq.tail); // give turn to next thread
19:  }
```

FIG. 6

```
0: lock_t scheduler_lock; // lock owned by the scheduler
1: queue_t activeq, waitq[N];
2: pthread_mutex_lock_wrapper(pthread_mutex_t *mutex) {
3: retry:
4:   lock(scheduler_lock); // wait for our turn                    ———— 702
5:   if(!pthread_mutex_trylock(mutex)) {// mutex acquired
6:     append(schedule, self()); // add tid to schedule
7:     unlock(scheduler_lock); // give turn to a next thread       ←——— 706
8:     return;
9:   }
10:  unlock(scheduler_lock); // give turn to a next thread          ←——— 708
11:  goto retry; // wait for our turn again
12: }
13: pthread_mutex_unlock_wrapper(pthread_mutex_t *mutex) {
14:  lock(scheduler_lock); // wait for our turn                    ———— 704
15:  pthread_mutex_unlock(mutex); // mutex released
16:                                                                 ———— 712
17:  append(schedule, self()); // add tid to schedule
18:  unlock(scheduler_lock); // give turn to a next thread          ←——— 710
19: }
```

```
1 : pthread_mutex_lock_wrapper(mutex) {
2 :   down(sem[self()]); // wait for our turn
3 :   pthread_mutex_lock(mutex);
4 :   next = shift_schedule; // find next thread in schedule
5 :   up(sem[next]); // wake up next thread
6 : }
```

FIG. 9

METHODS, SYSTEMS, AND MEDIA FOR PROVIDING DETERMINISM IN MULTITHREADED PROGRAMS

CROSS REFERENCE TO RELATED APPLICATION

This application claims the benefit of U.S. Provisional Patent Application No. 61/367,357, filed Jul. 23, 2010, which is hereby incorporated by reference herein in its entirety.

STATEMENT REGARDING FEDERALLY SPONSORED RESEARCH OR DEVELOPMENT

This invention was made with government support under CNS-1012633 and CNS-0905246 awarded by the National Science Foundation, and under FA8650-10-C-7024 and FA8750-10-2-0253 awarded by the Air Force Research Laboratory (AFRL). The government has certain rights in the invention.

TECHNICAL FIELD

This application relates to methods, systems, and media for providing determinism in multithreaded programs.

BACKGROUND

Multithreaded programs are difficult to write, test, and debug. A key reason is nondeterminism: different runs of a multithreaded program may show different behaviors, depending on how the threads interleave. Such multithreading and nondeterminism can cause races, such as data races, atomicity violations, order violations, and any other concurrency errors, in programs.

Two main factors make threads interleave nondeterministically. The first factor, which causes scheduling nondeterminism, is scheduling: how the operating system (OS) and hardware schedule threads. The second factor, which causes input nondeterminism, is input: what data (input, data) arrives at what time (input timing).

A DMT system is, conceptually, a function that maps an input I to a schedule S. The properties of this function are that the same I should map to the same S and that S is a feasible schedule for processing I.

Existing deterministic multithreading (DMT) systems make threads more deterministic by eliminating scheduling nondeterminism. Specifically, such systems constrain a multithreaded program such that it always uses the same thread schedule for the same input. By doing so, these systems make program behaviors repeatable, increase testing confidence, and ease bug reproduction.

Unfortunately, though existing DMT systems eliminate scheduling nondeterminism, they do not reduce input nondeterminism. In fact, they may aggravate the effects of input nondeterminism because of their design limitation: when scheduling the threads to process an input, they consider only this input and ignore previous similar inputs. This stateless design makes schedules over-dependent on inputs, so that a slight change to inputs may force a program to venture into a vastly different, potentially buggy schedule, defeating many benefits of determinism.

In fact, even with the same input, existing DMT systems may still force a program into different schedules for minor changes in the execution environment such as processor type and shared library. Thus, developers may no longer be able to reproduce bugs by running their program on the bug-inducing input, because their machine may differ from the machine where the bug occurred.

Moreover, few existing DMT systems work with server programs whose inputs arrive continuously and non-deterministically.

SUMMARY

Methods, systems, and media for providing determinism in multithreaded programs are provided. In some embodiments, methods for providing determinism in multithreaded programs are provided, the methods comprising: instrumenting a program with: a proxy that: receives inputs to the program; and determines whether a schedule corresponding to a set of input constraints satisfied by the inputs has been memoized; and a replayer that: if it is determined that a schedule corresponding to a set of input constraints satisfied by the inputs has been memoized, processes the inputs by the program according to the schedule.

In some embodiments, methods for providing determinism in multithreaded programs are provided, the methods comprising: receiving inputs to a program; determining whether a schedule corresponding to a set of input constraints satisfied by the inputs has been memoized; and, if it is determined that a schedule corresponding to a set of input constraints satisfied by the inputs has been memoized, processing the inputs by the program according to the schedule.

DETAILED DESCRIPTION

Methods, systems, and media for providing determinism in multithreaded programs are provided.

In accordance with some embodiments, schedule-centric, stateful DMT mechanisms are provided. In some embodiments, these mechanisms memoize past working schedules and reuses them for future inputs. In order to do so, for example, these mechanisms can maintain a cache of past schedules and the input constraints required to reuse these schedules. When an input arrives, these mechanisms can check the input against the memoized constraints for a compatible schedule. If it finds one, it simply runs the program while enforcing this schedule. Otherwise, it runs the program to memoize a schedule and the input constraints of this schedule for future reuse. By reusing schedules, these mechanisms can avoid potential errors in unknown schedules.

In some embodiments, these mechanisms can split a continuous request stream of a server into windows and let the server quiesce in between, so that the schedules used during the windows can be memoized and the schedules reused across future windows. Within a window, requests can be limited to being admitted only at fixed schedule points, reducing timing non-determinism.

In some embodiments, these mechanisms can run as "parasitic" user-space schedulers within the application's address space, overseeing the decisions of the operating system (OS) scheduler and synchronization library. The mechanisms can memoize and reuse synchronization orders as schedules to increase performance and reuse rates. In some embodiments, input constraints can be tracked using a modified version of KLEE, a symbolic execution engine, which is described in C. Cadar et al., "KLEE: Unassisted and automatic generation of high-coverage tests for complex systems programs," In Proceedings of the Eighth Symposium on Operating Systems Design and Implementation (OSDI '08), pp. 209-24, December 2008, which is hereby incorporated by reference herein in its entirety. In this modified version, KLEE can spawn a new KLEE instance for each new thread, and may only collect constraints without solving them.

Figure 1:
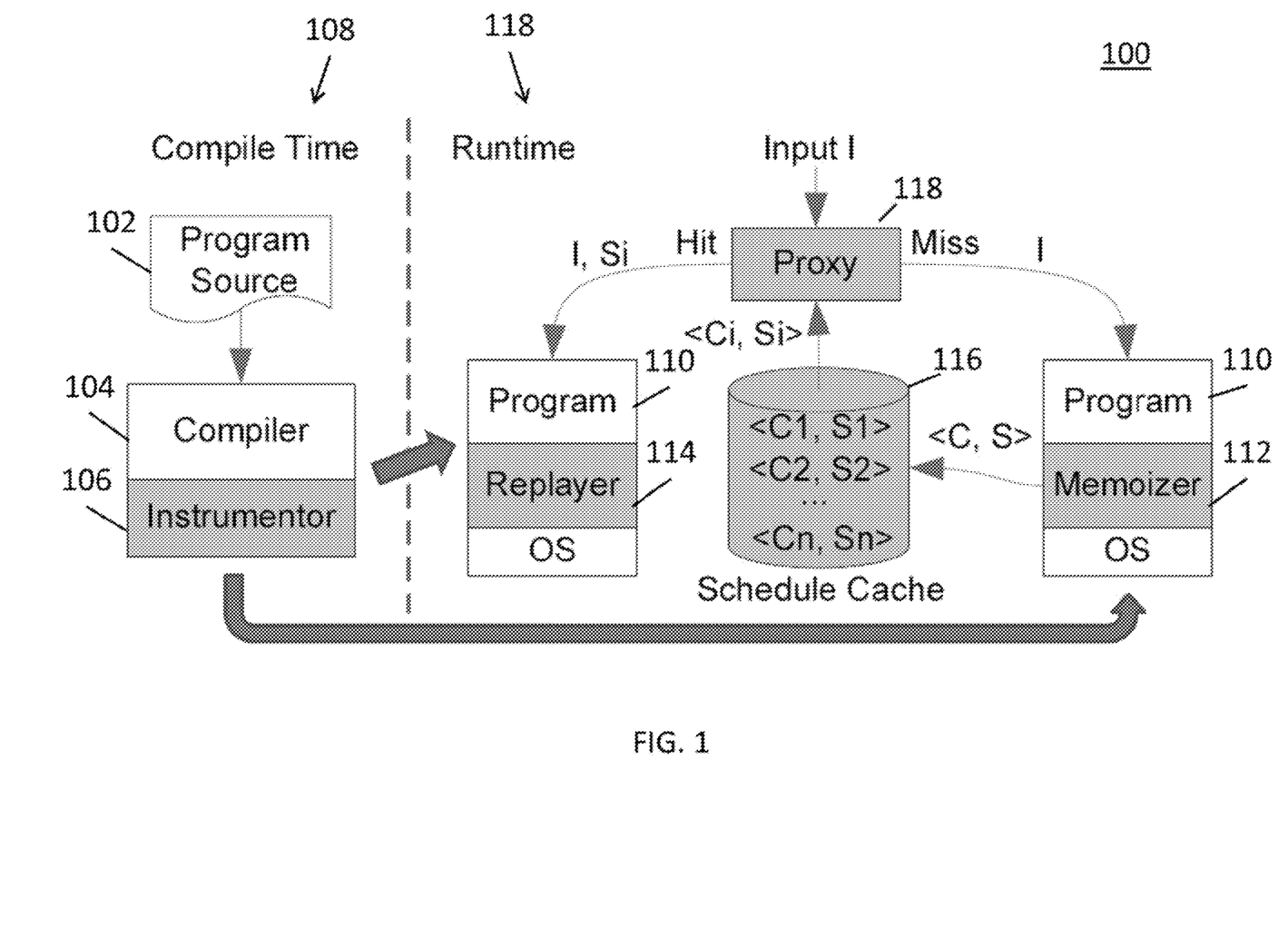
FIG. 1 shows an example of an architecture for a deterministic multithreading mechanism in accordance with some embodiments.

FIG. 1 shows an example of an architecture 100 for a deterministic multithreading (DMT) mechanism in accordance with some embodiments. As shown, in this architecture, program source code 102 is first received by a compiler 104 and instrumentor 106 at compile time 108. Source code 102 can be annotated to indicate input data that may affect synchronization operations. Compiler 104 and instrumentor 106 can then compile and instrument the source code to produce program 110 with memoizer 112 and replayer 114. This compilation and instrumentation can intercept standard synchronization operations such as "pthread mutex lock( )" so that, at runtime, these operations can be controlled.

Any suitable mechanism(s) can be used to implement compiler 104 and/or instrumentor 106. For example, in some embodiments, compiler 104 and/or instrumentor 106 can be implemented in software running on a general or special purposed computer. In some embodiments, compiler 104 and instrumentor 106 can be implemented using a compiler for compiler 104 and a plug-in to the compiler for instrumentor 106. For example, the compiler can be the LLVM compiler (available from the Web site at http://www.llvm.org) and the instrumentor can be implemented as a plug-in to the LLVM compiler. In some embodiments, the compiler and the instrumentor can be integrated.

As also shown, a schedule cache 116 can be used to store memoized schedules and their input constraints. This cache can be stored on any suitable storage mechanism or combination of mechanisms. For example, this cache can be stored in memory, then stored to disk when the program, memoizer, and replayer are shutdown, and then read back from disk to memory upon program start. Each memoized schedule stored in cache 116 can be accessed using a tuple <C, S>, where S is a synchronization order and C is the set of input constraints required to reuse S, in some embodiments.

At runtime 118, once an input I arrives, a proxy 120 can intercept the input and query schedule cache 116 for a constraint-schedule tuple <Ci, Si> such that I satisfies Ci. If the tuple is found in the cache (i.e., a cache hit), the proxy can send the input I and schedule Si to program 110 and replayer 114 so that the program can process input I according to schedule Si as enforced by the replayer.

If the tuple is not found in the cache (i.e., a cache miss), the proxy can send the input I to program 110 and memoizer 112 so that the program can process input I and the memoizer can memoize a new schedule. During memoization, the memoizer can record all synchronization operations into a schedule S in some embodiments. The memoizer can additionally or alternatively also compute C, the input constraints for reusing S, via symbolic execution (e.g., by tracking the outcomes of branches that observe the data annotated as affecting synchronization) in some embodiments. Once memoization ends, these constraints C can be stored in the schedule cache as describing the schedule as part of a <Ci, Si> tuple.

In some embodiments, before the schedule is stored in the schedule cache, the memoizer can check for data races in a schedule being memoized. If races are detected, the schedule can be discarded and the program re-run with a different scheduling algorithm to memoize another schedule. Additionally or alternatively, in some embodiments, the schedule can be stored with an indication that a rice was present for subsequent debugging and/or testing efforts.

In some embodiments, the proxy can perform an additional task for server programs to reduce input timing non-determinism and to reuse schedules for these programs. Specifically, in some embodiments, the proxy can buffer the requests of a server into a window prior to processing them with a schedule to be memoized or reused. Any suitable window can be used in some embodiments, and this window can have any suitable size (such as being a fixed size) or sizes (such as being dynamically sized). When the window becomes full, or remains partial for a period of time (any suitable period of time can be used), the server program can process requests in the window as if the server program were a batch program. The server program can then be allowed to quiesce (e.g., after processing all of the requests in the window) before processing the requests in the next window in order to avoid interference between the windows.

To buffer requests, the points in server's code at which the server receives a request and at which it is done processing the request can be annotated in some embodiments using begin task( ) and end task( ) annotations as described below.

Figure 2:
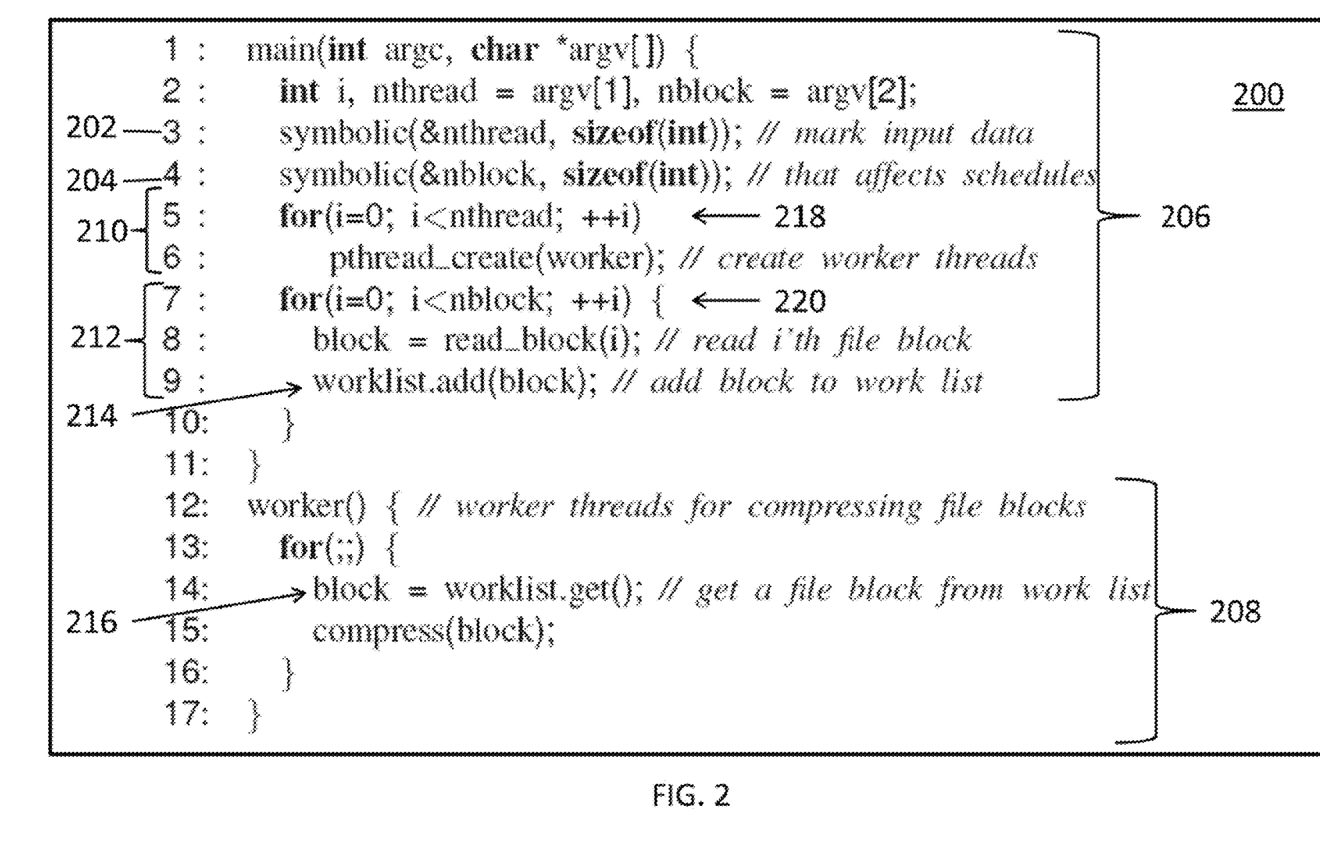
FIG. 2 shows an example of simplified code of a compression program in accordance with some embodiments.
Figure 3:
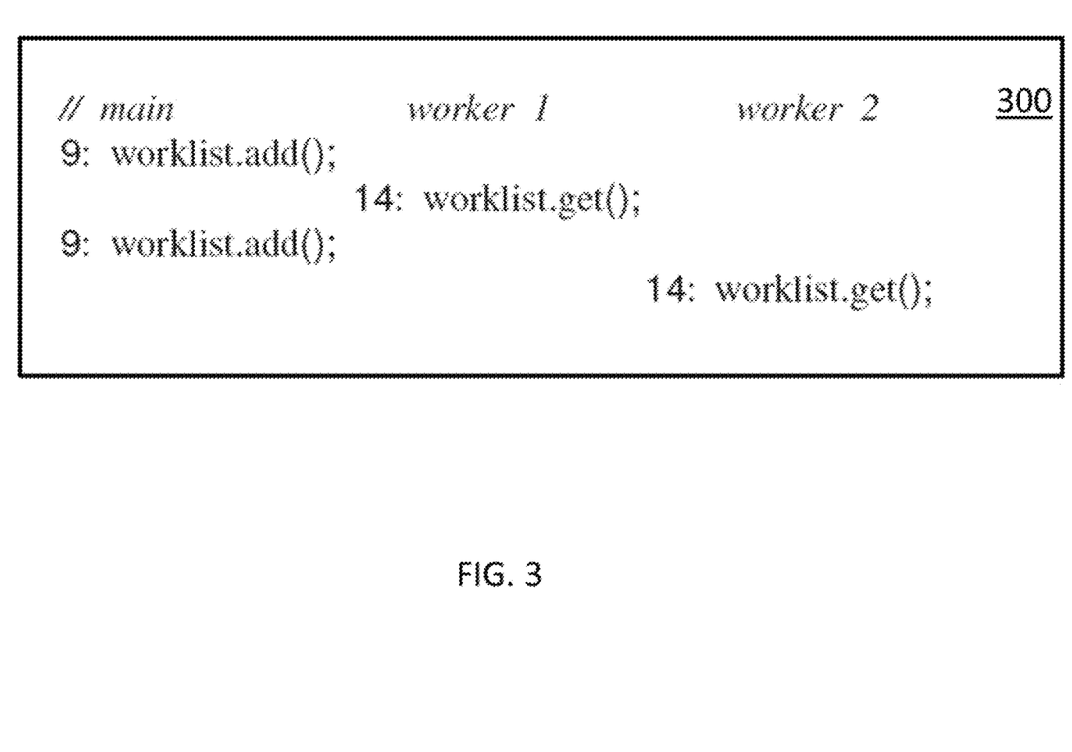
FIG. 3 shows an example of a schedule in accordance with some embodiments.
Figure 4:
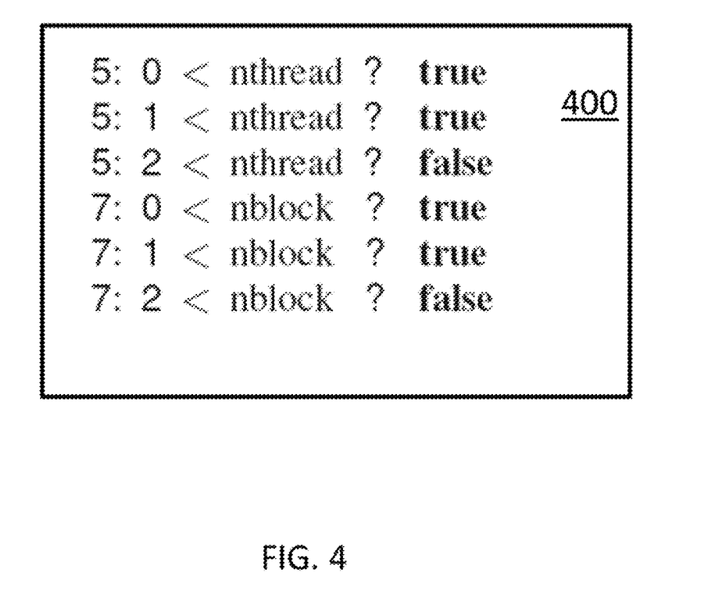
FIG. 4 shows examples of constraints in accordance with some embodiments.

FIGS. 2-4 illustrate an example of memoization and reuse of a schedule on a compression program in accordance with some embodiments. FIG. 2 shows an example of simplified code 200 of the compression program. As illustrated, variables nthread and nblock affect synchronizations, so these variables are marked by calls to "symbolic( )" (line 3 202 and line 4 204). A main routine 206 in the code spawns nthread worker threads 208, splits an input file into nblock blocks at 210, and compresses the blocks in parallel by calling compress( ) at 212. To coordinate the worker threads, code 200 uses a synchronized work list.

Suppose, for example, that this program is run with two threads on a two-block file, that schedule cache 116 (FIG. 1) is empty, and that memoizer 112 (FIG. 1) memoizes a new schedule. As code 200 runs, the synchronization operations (line 9 214 and line 14 216) are controlled and recorded. The outcomes of branch statements that observe symbolic data (line 5 218 and line 7 220) are also tracked. At the end of the run, a schedule 300 is recorded as shown in FIG. 3. Constraints 400 are also collected as shown in FIG. 4, which simplify to the logic statement "nthread=2^nblock=2". The schedule and the input constraints are then stored into schedule cache 116 (FIG. 1).

If code 200 is run again with two threads on a different two-block file, the variables nthread and nblock are checked to determine if they satisfy any set of constraints in schedule cache 116 (FIG. 1). In this case, because there are two threads and a two-block input file, a <C, S> tuple corresponding to this run is found in the cache. Schedule 300 (FIG. 3) is then reused to compress the file, even though the file data may differ completely.

In accordance with some embodiments, programs using the DMT mechanism described herein can be deployed with pre-populated caches of correct, representative schedules on typical workloads, wherein the caches are hardwired and marked as read-only.

In some embodiments, users can be able to turn-on memoization so that schedules can be memoized as the programs run on given inputs.

In some embodiments, because tracking input constraints may be slow, schedules can be memoized asynchronously. For example, in some embodiments, for an input where no <C, S> tuple is found in schedule cache 116 (FIG. 1), proxy 118 (FIG. 1) can run the program without any schedule control, while forwarding a copy of the input to the memoizer for offline schedule memoization.

Figure 5:
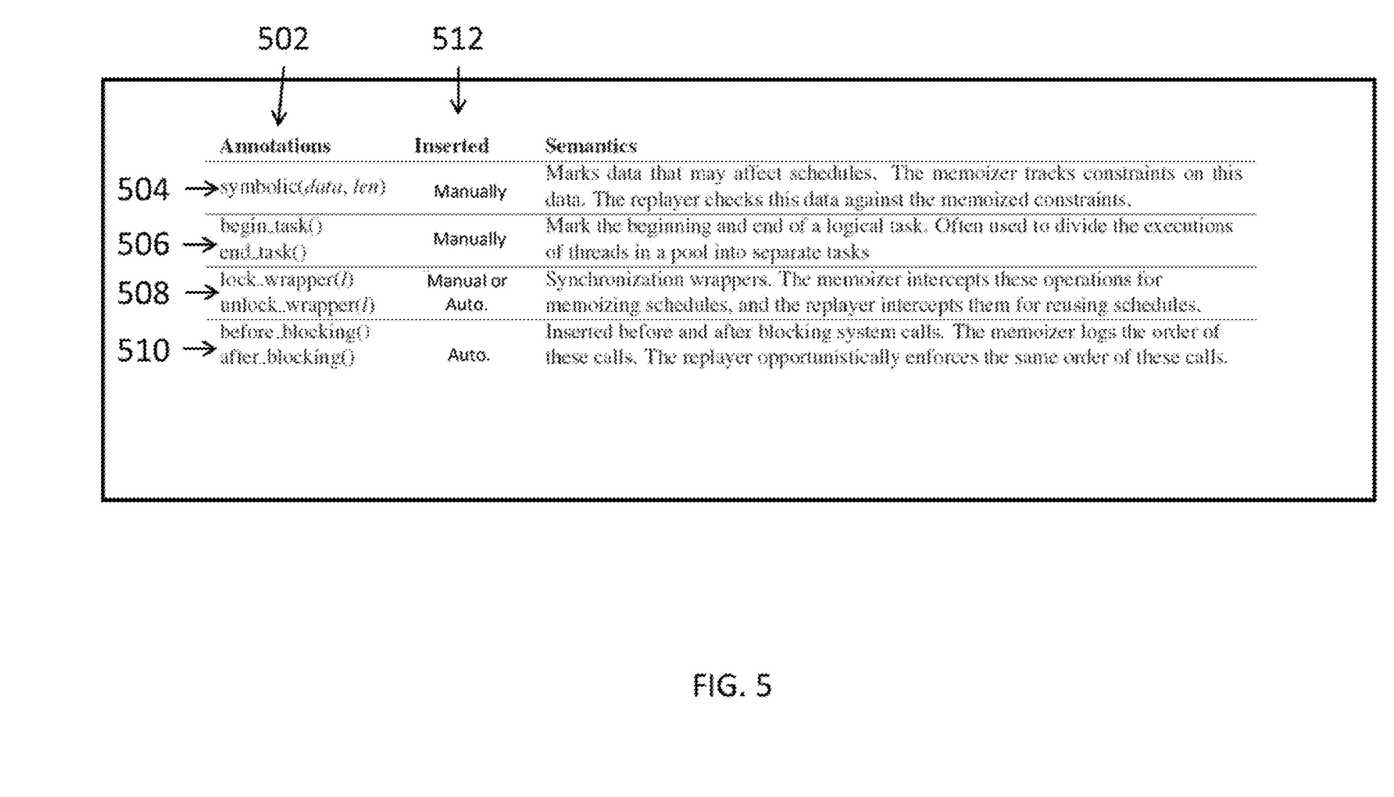
FIG. 5 shows examples of annotations in accordance with some embodiments.

FIG. 5 shows examples of annotations 502 that can be used to annotate multithreaded programs in accordance with some embodiments. The annotations fall into four categories: (1) symbolic( ) annotations 504 for marking data that may affect schedules; (2) task boundary annotations 506 for marking the beginning and end of logical tasks, in case threads get reused for different logical tasks; (3) wrapper annotations 508 to synchronization operations; and (4) hook function annotations inserted around blocking system calls.

In some embodiments, for example, pthread operations (e.g., pthread mutex lock( ), pthread create( ) and pthread cond wait( ), atomic operations such as atomic dec( ) and atomic inc( ) and blocking system calls (e.g., sleep( ) accept( ) recv( ), select( ) and read( ) can be hooked by hook function annotations. Any other operations can additionally or alternatively be hooked in some embodiments.

Annotations can be added to program source automatically and/or manually in accordance with some embodiments. For example, annotations for each of categories 504, 506, 508, and 510 can be added automatically and/or manually as shown in column 512. As a more particular example, annotations for pthread operations and atomic operations can be added manually in accordance with some embodiments. As another example, custom synchronizations (e.g., custom spin locks) can also be manually annotated. As yet another example, annotations for standard synchronization and blocking system calls can be added automatically in some embodiments.

In some embodiments, to memoize schedules, the memoizer can control and log synchronization operations using a round-robin (RR) algorithm that forces each thread to do synchronizations in turn. The memoizer can implement such an algorithm by implementing wrapper functions 508 of FIG. 5 in some embodiments. For example, in FIG. 6, examples of wrappers 602 and 604 to pthread mutex lock( ) and pthread mutex unlock( ) respectively, are illustrated. As shown, using these wrapper functions, the memoizer can maintain a queue of active threads ("activeq"). The thread at the head of the queue ("activeq.head") (line 4 606 and line 14 608) can be permitted to run next (i.e., it "has the turn"). Once the thread is done with the current operation, it allows the next thread to run (i.e., it "gives up the turn") by moving itself to the tail of the queue ("activeq.tail") (line 7 610 and line 18 612).

Figure 6:
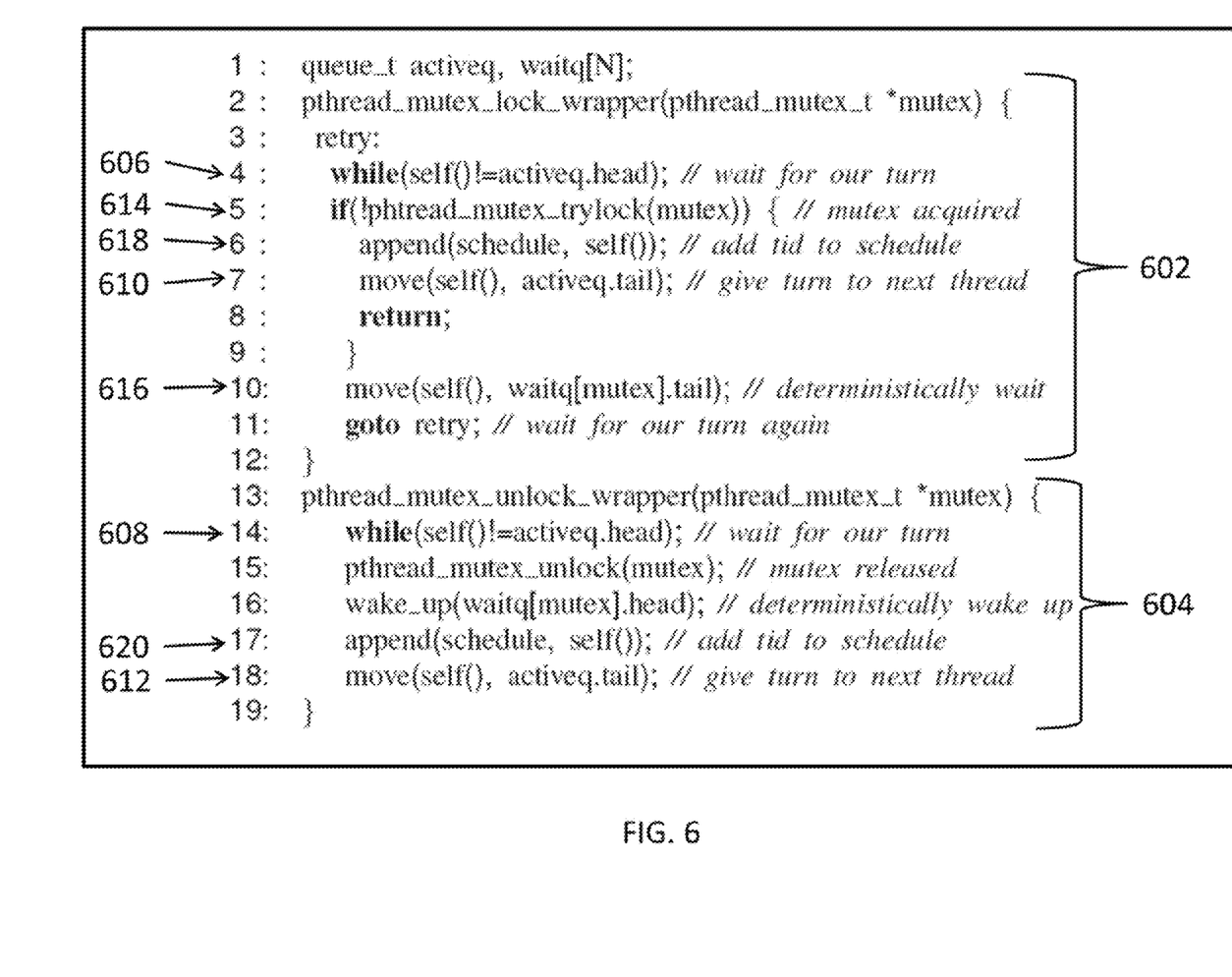
FIG. 6 shows examples of wrapper functions in accordance with some embodiments.

In accordance with some embodiments, to avoid a deadlock scenario when the head of the queue attempts to grab an unavailable mutex, the non-blocking lock operation can be called instead of the blocking one, as shown, for example, in line 5 614. If the mutex is not available, the thread can give up its turn and wait on a wait queue, as shown, for example, in line 10 616. Such wait queues can be used to avoid nondeterministic wakeup orders in the pthread library.

In some embodiments, synchronizations (line 6 618 and line 17 620) can be logged only when the thread has the turn, so that the log faithfully reflects the actual order of synchronizations.

In some embodiments, internal thread IDs can be maintained in order to avoid non-determinism in the operating system (OS) thread IDs across runs. For example, as shown in FIG. 6, function self( ) can return this internal ID for the current thread at line 6 618 and line 17 620).

The memoizer can allow a thread to break out of the round-robin when the thread has waited for its turn for over a second (or any other suitable period of time). The rationale for this is that if a thread has waited too long, the current schedule may perform poorly in reuse runs.

Figure 7:
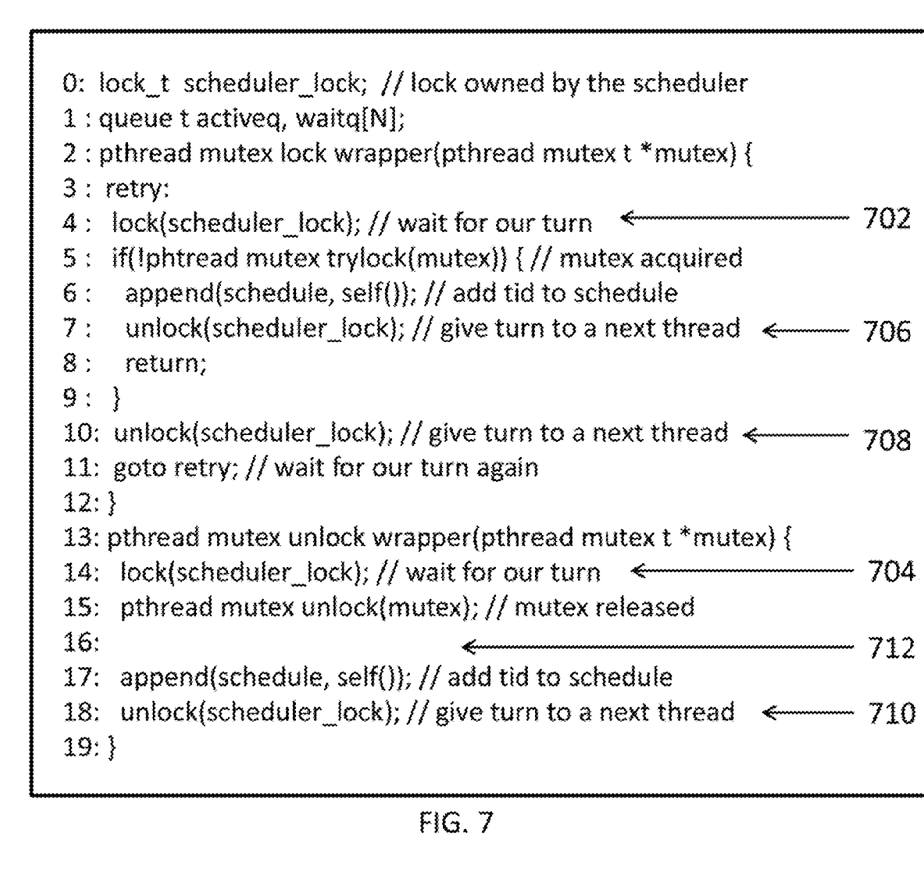
FIG. 7 shows an example of pseudo code for a first come, first served algorithm in accordance with some embodiments.

In some embodiments, if the memoizer detects a race using the round-robin algorithm, it can restart the run and switch to a first-come, first served (FCFS) algorithm. Such a FCFS algorithm can be implemented using the illustrative code of FIG. 7. As shown, this code is like that of FIG. 6 except that line 4 and line 14 of FIG. 6 are replaced with lock operations 702 and 704 in FIG. 7, line 7, line 10, and line 18 of FIG. 6 are replaced with unlock operations 706, 708, and 710 in FIG. 7; and line 16 in FIG. 6 is replaced with a NOP 712 in FIG. 7.

In some embodiments, the memoizer can include hooks functions around blocking system calls in the schedule it memoizes. However, the replayer may only opportunistically replay these hooks when reusing a schedule because the returns from blocking system calls may be driven by the program's environment.

In some embodiments, the memoizer can track the constraints on marked symbolic data by tracking (1) what data is derived from the symbolic data and (2) the outcomes of the branch statements that observe this symbolic and derived data. At the end of a memoization run, the set of branch outcomes together can be used to describe the constraints to place on the symbolic data required to reuse the memoized schedule. That is, if an input to a program satisfies these constraints, the program can be re-run in the same way as the memoized run.

Once the memoizer memoizes a schedule S and its constraints C, the tuple <C, S> can be stored into schedule cache 116 (FIG. 1). In some embodiments, the schedule cache can be structured as a decision tree. This may be desirable because a program may incrementally read inputs from its environment and call symbolic( ) multiple times. For example, the code in FIG. 2 calls symbolic( ) twice.

Figure 8:
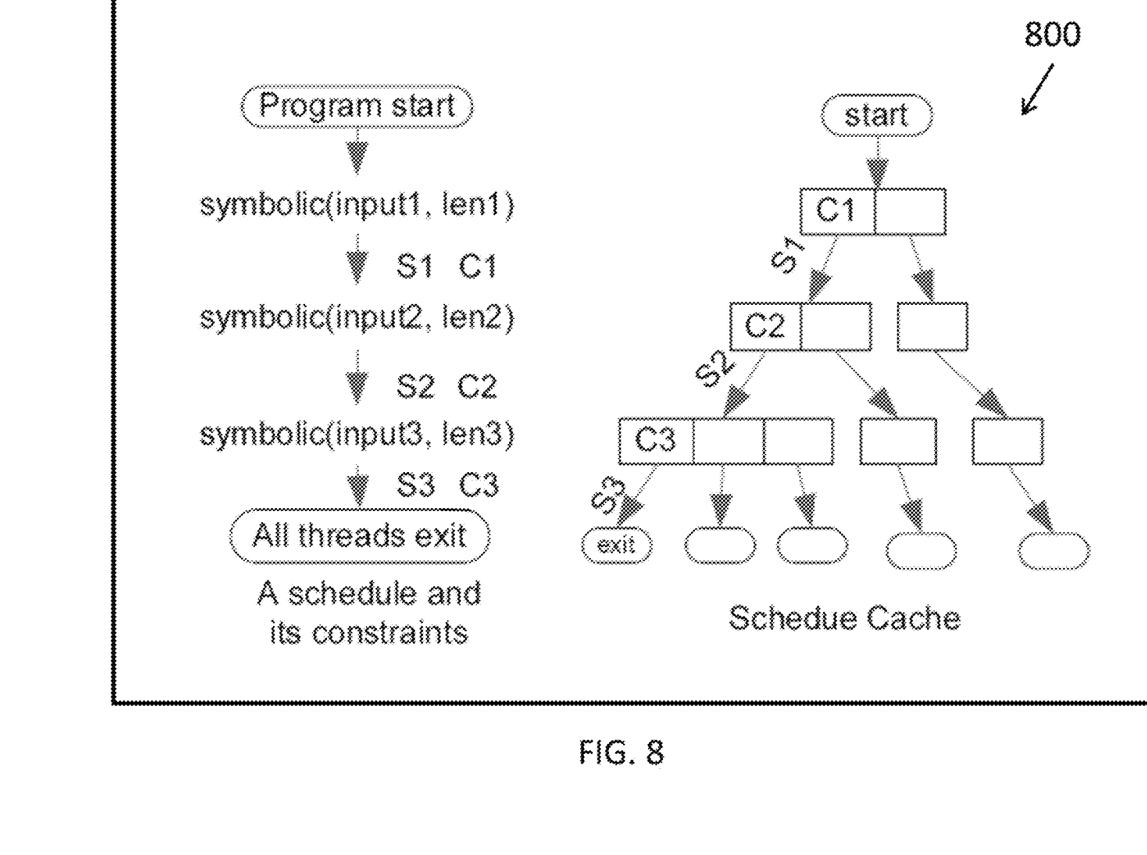
FIG. 8 shows an example of a decision tree in accordance with some embodiments.

FIG. 8 illustrates a decision tree 800 of a schedule cache that can be constructed in accordance with some embodiments. Given a <C, S> tuple, this tuple can be broken down into sub-tuples <$C_i$, $S_i$> separated by symbolic( ) calls, where $S_i$ contains the synchronization operations logged and $C_i$ contains the constraints collected between the ith and (i+1)th symbolic( ) calls. The sub-tuples can then be merged into the ith level of the decision tree.

Redundant (or overlapping) tuples may be prevented from being merged into the cache in some embodiments. For example, if the cache contains a tuple with less restrictive constraints than the tuple being merged, the new tuple can be discarded.

To speed up cache lookup, <Ci, Si> tuples within the same decision node can be sorted based on their reuse rates, defined as the number of successful reuses of Si over the number of inputs that have satisfied Ci, so that the highest ranking schedules for that decision node are used first, in accordance with some embodiments. To reduce the size of the schedule cache, bad or unsuccessful schedules can be removed from the cache based on reuse rates.

To reuse a schedule, a check is made to determine if a current input satisfies the input constraints of the schedule. To do so, an iterator to the decision tree of the schedule cache can be maintained. The iterator starts from the root. As the program runs and calls symbolic( ), the iterator can be moved down the tree. A check can then be made to determine if the data passed into a symbolic( ) call satisfies any set of constraints stored at the corresponding decision tree node and, if so, the corresponding schedule can be enforced.

Figure 9:
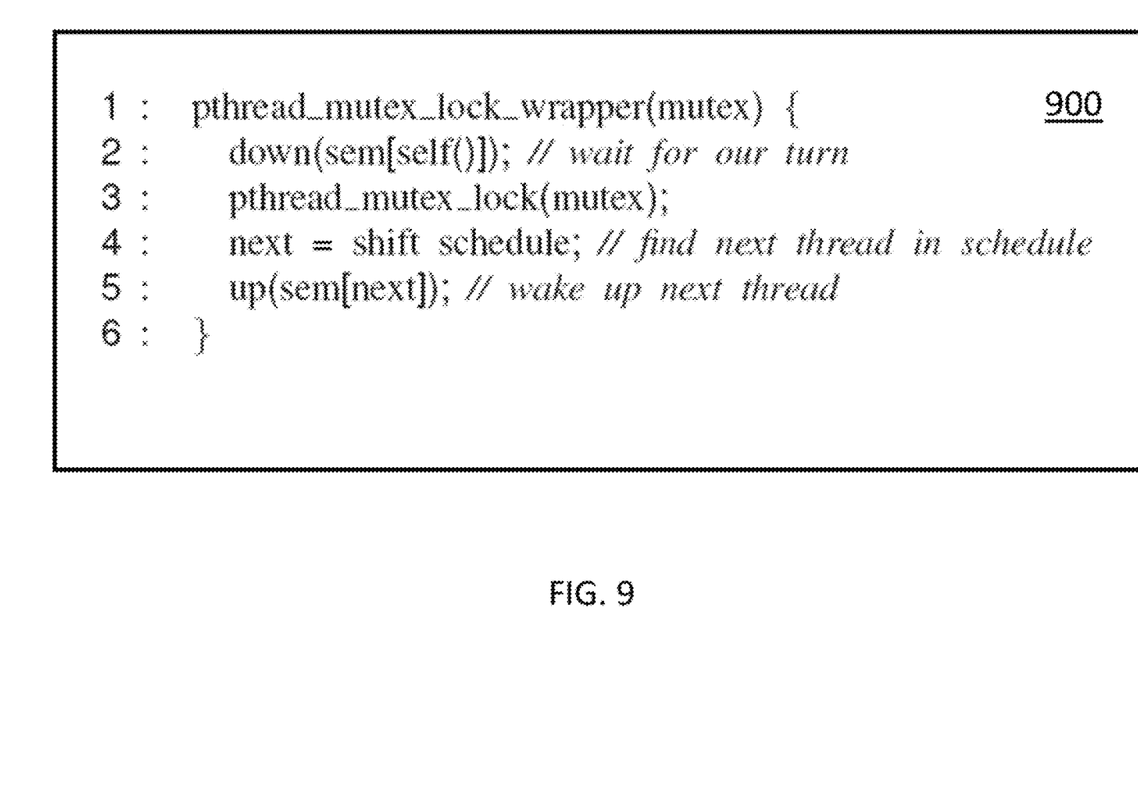
FIG. 9 shows an example of pseudo code from using semaphores to enforce schedules in accordance with some embodiments.

In accordance with some embodiments, to enforce a synchronization order, the replayer can use the following technique: first, the replayer assigns each thread a semaphore; next, before performing a synchronization operation, a thread has to wait on its semaphore for its turn; once the thread's turn occurs, the operation can be performed; and then, after completing its operation, the thread passes the turn to the next thread in the schedule by signaling the semaphore of the next thread. An example of psuedo code 900 for implementing this technique in accordance with some embodiments is illustrated in FIG. 9

Hidden states can impact the schedule of operation of a program. For example, when data is retrieved from cache instead of disk, that retrieval may involve hidden states. To accurately select a schedule to reuse, hidden states that affect schedules can be annotated using symbolic( ) in some embodiments. However, in some embodiments, even if a hidden state is not annotated, a schedule corresponding to that state can possibly still be memoized and reused based on the schedule cache having the capability to store multiple schedules for the same set of constraints and select which schedule to use based on reuse rates (as described above).

In some embodiments, memoized schedules having races with respect to the order constraints of the schedules (which raises can be referred to as schedule races) can be detected and discarded from the schedule cache, and a new schedule free of such races can be determined. Additionally or alternatively, in some embodiments, the schedule can be stored with an indication that a race was present for subsequent debugging and/or testing efforts. For example, when one memory access to a given memory location can happen concurrently with another memory access to the same memory location, a race can be detected. In some embodiments, however, such detected races can additionally be determined as being benign (and thus ignored) when the relative order of two operations (e.g., memory accesses) does not alter with respect to the recorded or enforced synchronization order. In some embodiments, any other suitable techniques can be used to determine if a race is benign, and thus can be ignored. For example, a write-write race can be determined as being benign if both instructions write the same value. As another example, a read-write race can be determined as being benign if the value written by one instruction does not affect the value read by another.

In some embodiments, input-data-dependent races (which can be referred to as symbolic races) can be detected. For example, two memory accesses to the same memory location based on input data can result in an input-data-dependent race. To detect symbolic races, the underlying symbolic execution engine can be queried for pointer equality. For example, to detect a symbolic race based on memory accesses "a[i]" and "a[j]", the underlying symbolic execution engine can be queried for the satisfiability of the logic statement "&a[i]=&a[j]". If this statement is true, the memory accesses constitute a symbolic race and additional input constraints can be added to ensure that the race does not occur in reuse runs. For example, the input constraint "&a[i]≠&a[j]", which simplifies to i≠j, can be added in some embodiments.

In order to improve speed of execution of a program, in some embodiments, unnecessary synchronizations can be skipped. For example, in some embodiments, sleep( ), usleep( ), and pthread_barrier_wait( ) can be skipped.

In some cases, a set of constraints may not be simplified, potentially resulting in longer than necessary constraint checking overhead. For example, consider a loop "for (int i=0; i!=n; ++i)" with a symbolic bound n. When running this code with n=10, a set of constraints {0≠n, 1≠n, . . . , 10=n} can be collected, but constraint 10=n (a simplified constraint set) alone implies the larger set. To simplify constraints, in some embodiments, a greedy algorithm can be used. Given a set of constraints C, the algorithm can iterate through each constraint c (from the constraints collected earliest to the constraints collected most recently), check if C/{c} implies {c}, and, if so, discard c.

In some cases, a branch statement may observe a piece of symbolic data but perform no synchronization operation in either branch. Thus, the constraints collected from this branch may be unlikely to affect schedules. To avoid unnecessarily increasing constraint checking time and to avoid preventing deterministic reuses of memoized schedules, branch statements that are unlikely to affect synchronization operations can be identified and their constraints ignored. For example, the constraints of a branch statement s can be ignored if no synchronization operations are between s and the immediate post-dominator of s, sd.

Any suitable hardware can be used to compile programs, instrument programs, run programs, memoize schedules of programs, control the reuse of schedules of programs, act, act as a proxy for program execution, and act as a schedule cache in accordance with some embodiments. For example, this hardware can include any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, in some embodiments, this hardware can include a personal computer, a personal data assistant (PDA), a portable email device, a multimedia terminal, a mobile telephone, a smart phone, a tablet computer, a laptop, a portable media player, a set-top box, a streaming media player, a network appliance, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for providing determinism in a multithreaded program, comprising:
   instrumenting the multithreaded program executed by a hardware processor with:
   a proxy that:
      receives first inputs to the multithreaded program; and
      determines whether a schedule of execution of a plurality of threads in the multithreaded program corresponding to a set of input constraints satisfied by the first inputs has been memoized, wherein the set of input constraints is satisfied by a plurality of inputs to the multithreaded program including the first inputs and second inputs, wherein the second inputs are different than the first inputs; and
   a replayer that:
      if it is determined that the schedule corresponding to the set of input constraints satisfied by the first inputs has been memoized, processes the first inputs by the multithreaded program according to the schedule.

2. The method of claim 1, further comprising also instrumenting the program with a memoizer that:
   records synchronization operations into the schedule;
   determines the set of input constraints corresponding to the schedule; and
   stores the schedule.

3. The method of claim 2, wherein the memoizer also determines if races are present in the schedule.

4. The method of claim 3, wherein the races are data races.

5. The method of claim 3, wherein the races are schedule races.

6. The method of claim 2, wherein the first inputs are requests and wherein the memoizer also buffers the requests in a window before recording the synchronization operations into the schedule.

7. The method of claim 2, wherein the memoizer records, determines the set of input constraints, and stores asynchronously of an execution of the program.

8. The method of claim 2, wherein the memoizer also tracks constraints on marked symbolic data.

9. The method of claim 8, wherein tracking constraints includes at least one of: tracking data that is derived from the marked symbolic data; tracking outcomes of branch statements that observe the marked symbolic data; and tracking outcomes of branch statements that observe the data is derived from the marked symbolic data.

10. The method of claim 2, wherein the schedules are stored by a constraint-schedule tuple.

11. The method of claim 2, wherein the schedules are stored as a decision tree.

12. The method of claim 2, wherein the memoizer also determines whether a schedule includes a symbolic race; and if a symbolic race is determined to be included in the schedule, adds additional input constraints to the set of input constraints to prevent the symbolic race in reuse of the schedule.

13. The method of claim 2, wherein the memoizer also simplifies the set of input constraints.

14. The method of claim 2, wherein the memoizer also ignores branch statements that are unlikely to affect synchronization operations.

15. The method of claim 1, wherein the first inputs are requests and wherein at least one of the proxy and the replayer buffer the requests in a window before the requests are processed.

16. The method of claim 1, wherein the proxy determines whether a schedule corresponding to a set of input constraints satisfied by the first inputs has been memoized comprising checking a prepopulated cache of memoized schedules.

17. The method of claim 1, wherein the program is instrumented to include at least one of: marking of data that may affect schedules; marking of the beginning and the end of logical tasks; annotating of synchronization operations; annotating of blocking system calls; and annotating of hidden states.

18. The method of claim 1, wherein at least one of the proxy and the replayer selects the schedule from a plurality of schedules with the set of input constraints based on a reuse rate of each of the plurality of schedules.

19. The method of claim 1, wherein processing the first inputs by the program according to the schedule comprises:
   assigning a first semaphore to a first thread of the program;
   assigning a second semaphore to a second thread of the program;
   causing the first thread to wait for the first semaphore to indicate that the first thread can run;
   when the first semaphore indicates that the first thread can run, running the first thread;
   causing the second thread to wait for the second semaphore to indicate that the second thread can run; and
   causing the second semaphore to indicate that the second thread can run when the first thread has finished running.

20. A method for providing determinism in a multithreaded program, comprising:
   receiving first inputs to the multithreaded program;
   determining whether a schedule of execution of a plurality of threads in the multithreaded program corresponding to a set of input constraints satisfied by the first inputs has been memoized, wherein the set of input constraints is satisfied by a plurality of inputs to the multithreaded program including the first inputs and second inputs, wherein the second inputs are different than the first inputs; and
   if it is determined that the schedule corresponding to the set of input constraints satisfied by the first inputs has been memoized, processing the first inputs by the multithreaded program according to the schedule.

* * * * *